US005790777A

United States Patent [19]
Izuta et al.

[11] Patent Number: 5,790,777
[45] Date of Patent: Aug. 4, 1998

[54] COMPUTER SYSTEM ANALYSIS DEVICE

[75] Inventors: Kazuya Izuta; Toshiya Ito; Yoshio Endo, all of Tokyo, Japan

[73] Assignee: Mitsubishi Denki Kabushiki Kaisha, Tokyo, Japan

[21] Appl. No.: 575,225

[22] Filed: Dec. 20, 1995

[30] Foreign Application Priority Data

Apr. 27, 1995 [JP] Japan ................................ 7-103791

[51] Int. Cl.$^6$ ............................................. G06F 11/00
[52] U.S. Cl. ............................ 395/183.21; 395/183.22
[58] Field of Search ..................... 395/183.21, 183.22, 395/185.01, 185.02, 183.01, 183.08, 183.09, 183.13

[56] References Cited

U.S. PATENT DOCUMENTS

| | | | |
|---|---|---|---|
| 4,628,511 | 12/1986 | Stitzlein | 371/22 |
| 4,821,269 | 4/1989 | Jackson | 371/16 |
| 4,949,252 | 8/1990 | Hauge | 364/200 |
| 4,967,414 | 10/1990 | Lusch | 371/51.1 |
| 5,119,377 | 6/1992 | Cobb | 371/19 |
| 5,157,667 | 10/1992 | Carusone, Jr. | 371/29.1 |
| 5,200,958 | 4/1993 | Hamilton | 371/16.4 |
| 5,218,605 | 6/1993 | Low | 371/16.1 |
| 5,245,615 | 9/1993 | Treu | 371/16.5 |
| 5,280,486 | 1/1994 | Arkin | 371/29.1 |
| 5,339,406 | 8/1994 | Carney | 395/575 |
| 5,390,323 | 2/1995 | Newell | 395/575 |
| 5,473,771 | 12/1995 | Burd | 395/182.02 |
| 5,487,136 | 1/1996 | Ro | 395/108 |
| 5,491,793 | 2/1996 | Somasundaram | 395/183.21 |
| 5,506,960 | 4/1996 | Meare | 395/183.21 |
| 5,533,193 | 7/1996 | Roscoe | 395/183.15 |

FOREIGN PATENT DOCUMENTS 57-120163  7/1982  Japan .

OTHER PUBLICATIONS

Microsoft Press Computer Dictionary, p. 227 Copyright 1994, Senior Contributor JoAnne Woodcock.

*Primary Examiner*—Albert Decady
*Attorney, Agent, or Firm*—Sughrue, Mion, Zinn, Macpeak & Seas, PLLC

[57] ABSTRACT

A computer system analysis device (100) has an alternative system (7b) for monitoring a computer system (7a) to be analyzed. The operation flow is switched from the system (7a) to the alternative system (7b) when a system failure of the system (7a) happens. A data searching section (10) fetches data value stored in a crash dump file (8b), a device file (8c), and the like as data collection files by using address data obtained from a kernel load module file (8a) corresponding to data items of a system failure requested by an input/output section (9) through which an operator requests to the device (100) to display data items and values thereof stored in the data collection files. The input/output section (9) receives the data items and values thereof from the data searching section (10) and displays them per page. The systems (7a, 7b) are made up of different processor systems, respectively.

20 Claims, 12 Drawing Sheets

FIG. 6

| FACTORS OF SYSTEM FAILURE | LISTS OF SYSTEM FAILURE, DATA ITEMS, | DATA ITEMS |
|---|---|---|
| EXTERNAL FACTOR | ABNORMAL VOLTAGE | POWER SUPPLY (AC, DC) |
| | ABNORMAL TEMPERATURE | SUBSTRATE, CPU, BODY, ··· |
| | ABNORMAL VIBRATION | LOWER SECTION OF BODY, INTERMEDIATE SECTION, UPPER SECTION, INPUT SIDE, |
| INTERNAL FACTOR | CPU LOAD | PROCESS SWITCH<br>THREAD SWITCH |
| | TRANSMISSION LOAD | INTERNAL BUS<br>EXTERNAL BUS<br>NETWORK<br>PORT |
| | INTERRUPTION | |
| | (INTERNAL DATA)<br>ABNORMAL MEMORY<br>ABNORMAL I/O | STATE OF PHYSICAL PAGE<br>ACCESS STATE OF DRIVER<br>QUEUE STATE OF DRIVER |
| | ABNORMAL PROCESS/ THREAD | STATE OF PROCESS/THREAD<br>STATE OF OPENED FILES<br>MEMORY CONTROL INFORMATION<br>HISTORY OF ACCESSED FUNCTIONS<br>CONTENTS OF REGISTERS<br>TASK LIST |
| | ABNORMAL IPC | LIST OF SEMAPHORE/MESSAGE/ SHARED MEMORY<br>DETAILED SEMAPHORE INFORMATION<br>DETAILED MESSAGE INFORMATION<br>DETAILED SHARED MEMORY INFORMATION |
| | ABNORMAL FILES/ SYSTEM | LIST OF inode/file ON MEMORY<br>LIST OF BUFFER·CACHE·HEADER<br>STATE OF USED BUFFER·CACHE SIZES |
| | ⋮ | ⋮ |

COMPUTER SYSTEM ANALYSIS DEVICE

BACKGROUND OF THE INVENTION

1. Field of the Invention

The present invention relates to a computer system analysis device for detecting a system failure of a computer system and analyzing the state of the computer system efficiently for unfavorable occurrence of failure of the computer system.

2. Description of the Prior Art

FIG. 9 is a configuration diagram showing a configuration of a conventional computer system analysis device for a computer system.

An example of a computer system analysis device having the configuration shown in FIG. 9 is disclosed in Japanese Laid-open Patent Applications No. 57-120163.

In the conventional computer system analysis device as shown in FIG. 9, a reference number 1 designates a main storage device, a reference number 2 denotes a central processing unit (CPU), and a reference number 3 denotes an input/output control section for controlling the operation of an input/output device 4. A reference number 5 designates a data collection section for collecting, storing, and analyzing various types of data when a system failure of a computer system is happened. The data collection section comprises a main storage device control section 5a having memory address registers for storing a read-out or fetched address for data stored in the main storage device 1, a memory data register 5b for storing instructions and data, a count register 5c for storing an operand data size, and a control section 5f.

When a system failure is caused in a computer system having the conventional computer system analysis device, the main storage device control section 5a in the data collection section reads out or fetches information relating to internal states of the computer system from the main storage device 1 at the time of the occurrence of the computer system failure. At this time, the computer system analysis device selects and transmits flags and data (or log-out flags and data) as log-information which will be used by programs to analyze the system failure based on contents stored in a memory address register in the main storage device control section 5a, a memory data register 5b for storing instructions and data, counter register for storing size information of instructions and data, and a decoder 5d for decoding and judging whether or not an instruction is a dump instruction.

The conventional computer system analysis device can analyze the cause of the system failure by using the log-out information such as the flags and data described above as analytical objects.

In the conventional computer system analysis device, it is difficult to select and obtain required data from the log-out information, so that it takes more time to analyze the system failure of the computer system and a range of the log-out information must be limited within data or information in a working area of the computer system. This is a problem.

SUMMARY OF THE INVENTION

An object of the present invention is invented to avoid the drawbacks of such conventional computer system analysis device having the structure described above.

It is an object of the present invention to provide, with the consideration to the drawbacks, a computer system analysis device which is capable of analyzing the state of a computer system more quickly in order to increase the reliability of the computer system when the computer system fails.

In accordance with one aspect of the present invention, there is provided a computer system analysis device comprising file generation means for detecting a system failure of a computer system to be an analysis target and for generating data collection target files to store required data items required for analyzing the system failure; input means for indicating data items in said data collection target files to be required for the analysis of the system failure; data fetch means for receiving the indicated data items from said input means and for searching said data collection target files and for fetching required data items stored in said data collection target files corresponding to the indicated data items; and output means for receiving the data items from said data fetch means and for displaying the data items.

In accordance with another aspect of the present invention, there is provided a computer system analysis device comprising: file generation means for detecting a system failure of a computer system to be an analysis target and for generating a data collection target file group comprising a plurality of data collection files to store required data items to analyze the system failure; storage means for storing said plurality of data collection files; input means for indicating data items stored in said data collection files to be required for the analysis of the system failure; analysis means for receiving the data items indicated by said input means and for searching said data collection target files and for fetching data items stored in said data collection files corresponding to the data items indicated by said input means; and output means for receiving the fetched data items from said analysis means and for displaying the detected data items.

Accordingly, the file generation section generates the data collection files which are required for analyzing the system failure immediately after a system failure of a target system is detected, data items requested by the input means are fetched in the data collection files and transmitted to the output means to display them. Therefore an operator can analyze the cause of the system failure and the state of the target system at the occurrence of the system failure in an early stage.

The computer system analysis device above, further comprises page display means for receiving the fetched data items from said analysis means and for arranging the fetched data items per page and for transmitting the arranged data items per page to said output means.

Accordingly, when an operator indicates data items to be required to analyze a system failure through the input means, he can analyze and recognize the cause of the system failure because the output means displays the fetched data items and values thereof corresponding to the indicated data items in an easily recognized form.

In the computer system analysis device above, said analysis means comprises address means for generating address data in the data collection files relating to the data items indicated by said input means based on a load module file (or a current execution file) which be executed by an arithmetic logical unit as a kernel section in said computer system, wherein said analysis means searches said plurality of data collection files based on the address data obtained by said address means.

Accordingly, address data which indicates the location of the required data items in the data collection files relating to the data items requested by the input means is obtained from the load module file (or the current execution file) which is executed by the arithmetic logical unit as the kernel section of the computer system, so that the data items indicated by the input means can be obtained instantly based on the address data.

In the computer system analysis device above, said file generation means generates a crash dump file, as one of said plurality of data collection files, expressing a memory image when the system failure of said computer system is happened and searches said crash dump file with the data items indicated by said input means to analyze the system failure of said computer system.

Accordingly, the analysis of the cause of the system failure can be rapidly performed because the crash dump file is made at the time of the occurrence of the system failure as one of the plurality of data collection target files and used for the analysis of the system failure.

In the computer system analysis device above, said file generation means generates a device file, as one of said plurality of data collection files, expressing a memory image when said computer system is in the normal operation, said analysis means searching said device file based on the data items indicated by said input means during the normal operation mode in order to analyze the system failure of said computer system.

Accordingly, the file generation means generates the device file expressing the memory image of the system which is executed in the normal operation. During the operation of the system under the normal operation, an operator can get and analyze the data items stored in the device file by requesting from the input means. The data items stored in the device file are displayed on the output means during the operation of the system.

The computer system analysis device above, further comprises: a state reference file for storing an allowable range of each of data items in the computer system to be used for analyzing a system failure during a normal operation mode of said computer system, and comparing means for comparing the data items in the state reference file with said data items indicated by said input means, wherein said comparing means has a function to transmit a comparison result to said output means.

Accordingly, because data items in the state reference file which stores a range of the various types of data items in the normal operation of the computer system are compared with data items stored in the data collection target file group, an operator can recognize and analyze data items relating to the cause of a system failure immediately.

The computer system analysis device above, further comprises: a system failure control table for storing system failure data items corresponding to various kinds of system failure and data items relating to these kinds of system failure to be analyzed; and means for searching data items relating to the system failure stored in said system failure control table based on the data items indicated by said input means and for reading out data items from said system failure control table and transmitting the obtained data items to said output means.

Accordingly, because the computer system analysis device of the present invention has the system failure control table in which data items relating to the system failure are defined and stored, when an operator requests to display information of a system failure, the device fetches data items relating to the cause of the system failure based on the request and the output means displays the fetched data items.

The computer system analysis device above further comprises means for displaying the data items obtained from said plurality of data collection files together with the data items requested by said input means on said output means in a one-to-one correspondence when the data items representing the cause of the system failure relating to the data items requested through said input means are displayed on the output means.

Accordingly, the analysis of the cause of the system failure can be rapidly performed because the values of data items in addition to the data items relating to the system failure are displayed on the output section.

The computer system analysis device above further comprises: a system failure control table for storing system failure data items corresponding to kinds of system failure and data items relating to these kinds of system failure to be analyzed; and means for searching data items relating to the system failure which would be caused stored in said system failure control table based on the data items indicated by said input means and for reading out data items from said system failure control table and transmitting these data items to said output means.

Accordingly, the detection of a system failure can be certainly performed because a list of data items fetched from the system failure control table, which will be caused by a system failure, relating to a data item requested by the input means can be displayed together with the requested data item on the output means.

In accordance with another aspect of the present invention, there is provided a control system analysis device comprising: (1) a first processor system comprising: a computer system as a target of an analysis of a system failure, said computer system executing under a normal operation; file generation means for detecting an occurrence of the system failure of said computer system and for generating a data collection file group comprising a plurality of data collection files which store data items to be required for analysis of the system failure. (2) memory storage means for storing said plurality of data collection files; (3) input means for indicating data items relating to the data items stored in said plurality of data collection files to be required for the analysis of the system failure; and (4) a second processor system used for analyzing the system failure of the first processor system at the time of the occurrence of the system failure, comprising: an alternative computer system for controlling the analysis of the system failure; switching means for switching the operation of said computer system to said alternative computer system when the system failure being happened; and analysis means for receiving the data items requested by said input means and for searching said data collection target files by using the requested data items and for fetching data items stored in said data collection files corresponding to the data items requested by said input means, (5) output means for receiving the fetched data items from said analysis means and for displaying the fetched data items; and (6) bus means through which said first processor system, said second processor system, said input means, and said output means are connected.

Accordingly, the system reliability of a system and the response speed of the system can be increased because the first processor system to be analyzed and the second processor system as the alternate system are incorporated into different processors in a multi-processor system having a plurality of processors, respectively.

In accordance with another aspect of the present invention, there is provided a control system analysis device comprising: (1) a first processor system comprising: a computer system as a target of an analysis of a system failure, said computer system executing under a normal operation; file generation means for detecting an occurrence of a system failure of said computer system and for generating a data collection file group comprising a plurality of data collection files which stores data items to be required for analysis of the system failure, (2) memory storage means for storing said plurality of data collection files; (3) input means for indicating data items relating to the data items stored in said plurality of data collection files to be required for the analysis of the system failure; and (4) a second processor system which being used to analyze the system failure of the first processor system at the time of the occurrence of the system failure, comprising: an alternative computer system for controlling the analysis of the system failure; switching means for switching the operation of said computer system to said alternative computer system when the system failure being happened; and analysis means for receiving the data items requested by said input means and for searching said data collection target files by using the requested data items and for fetching data items stored in said data collection files corresponding to the data items requested by said input means; and (5) output means for receiving the fetched data items from said analysis means and for displaying the fetched data items, wherein said first processor system and said second processor system are connected through a network, each of said first processor system and said second processor system is connected to said input means and said output means, and said second processor system is connected to said memory storage means.

Accordingly, the second processor system analyzes the cause of a system failure of the first processor system at a separate point or place in distance through the network because the first processor system to be analyzed and the second processor system as the alternative system are connected by a network.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram showing an illustrative example of a system failure control table used in the computer system analysis device shown in FIG. 5.

DESCRIPTION OF THE PREFERRED EMBODIMENTS

With reference to the accompanying drawings, preferred embodiments of a computer system analysis device according to the present invention will be described in detail.

EMBODIMENT 1.

Figure 1:
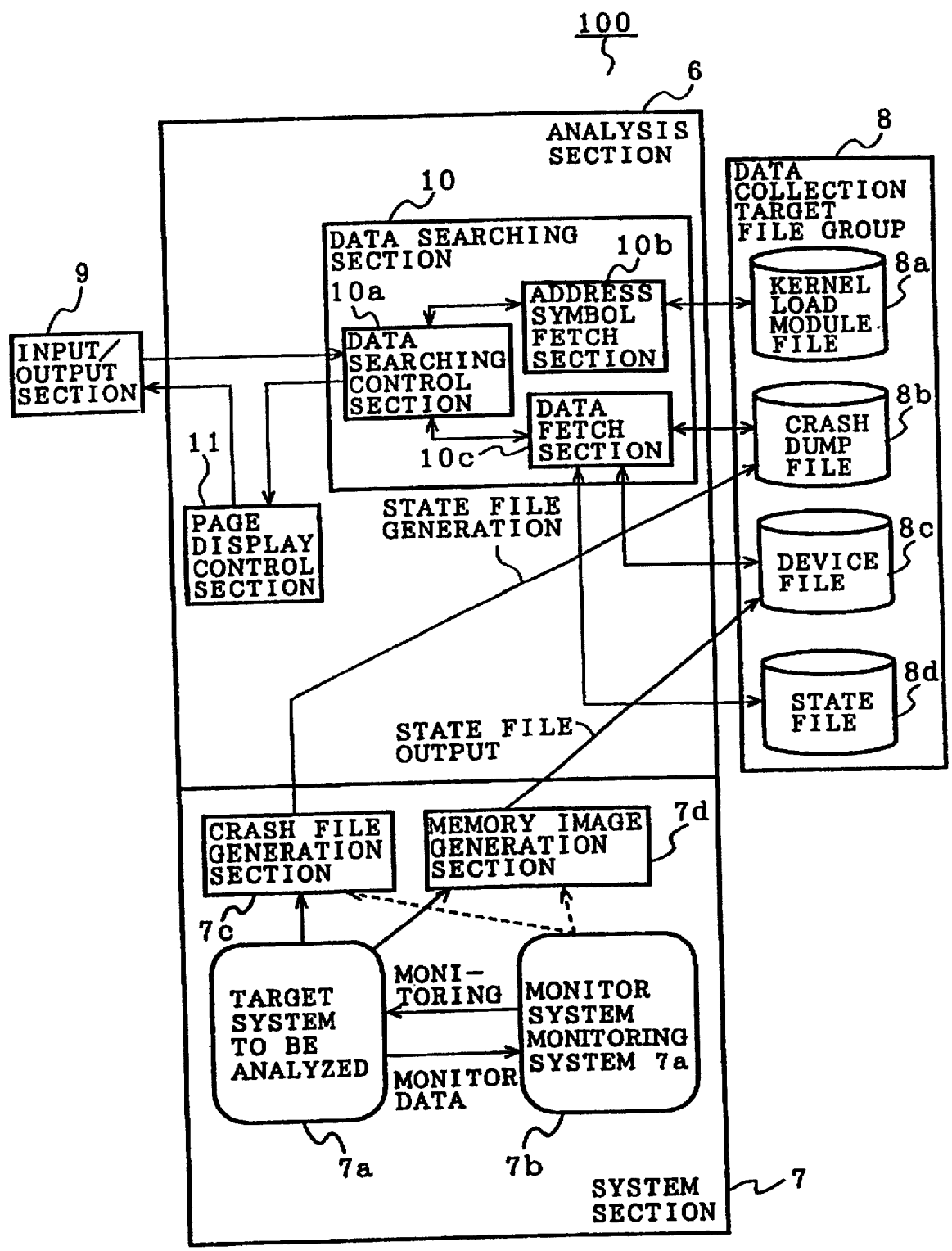
FIG. 1 is a configuration diagram showing a configuration of a computer system analysis device as an embodiment 1 according to the present invention.

FIG.1 is a configuration diagram showing a configuration of a computer system analysis device 100 for detecting and analyzing a system failure of a computer system as an embodiment 1 according to the present invention.

The computer system analysis device 100 basically comprises an analysis section 6 and a system section 7. A data collection object file group 8 and an input/output section 9 (as input means and output means) are connected to the system section 7 and the analysis section 6.

The system section 7 comprises a system 7a as a target for analysis of the system analysis device 100, a system 7b as an alternative system instead of the system 7a that is fallen into a system failure, a crash file generation section 7c for generating a crash dump file 8b when the system 7a as the analytical target to be analyzed by the computer system analysis device 100 when the system failure is happened, and memory image generation section 7d for generating a device file 8c expressing a memory image during the operation of the system 7a.

When the system failure of the computer system 7a is happened, as shown by a dotted arrow line in FIG. 1, the system 7b is connected to the analysis section through the crash file generation section 7c and the memory image generation section 7d.

There are the crash dump file 8b, the device file 8c, a kernel load module file 8a as an execution file of a kernel section of the computer system 7a, and a state file 8d for storing data obtained by searching the device file 8c in the collection file group 8 based on a request from the input/output section 9 such as a keyboard and a display monitor.

A reference number 10 designates a data searching section for searching required data for system analysis of the analysis section 6. This data searching section 10 comprises a data searching control section 10a, an address symbol fetch section 10b, and a data fetch section 10c. In addition, a reference number 11 designates a page display control section which is capable of receiving data transmitted from the data searching section 10, processing the data, and transmitting the predetermined number of data items per page which will be displayed per page on the input/output section 9.

Next, the operation of the computer system analysis device 100 of the embodiment 1 according to the present invention will be explained.

Firstly, the operation of the system section 7 in the computer system analysis device 100 will be explained with reference to FIGS. 2A and 2B which show the configuration and the operation of the system section 7.

Figure 2A:
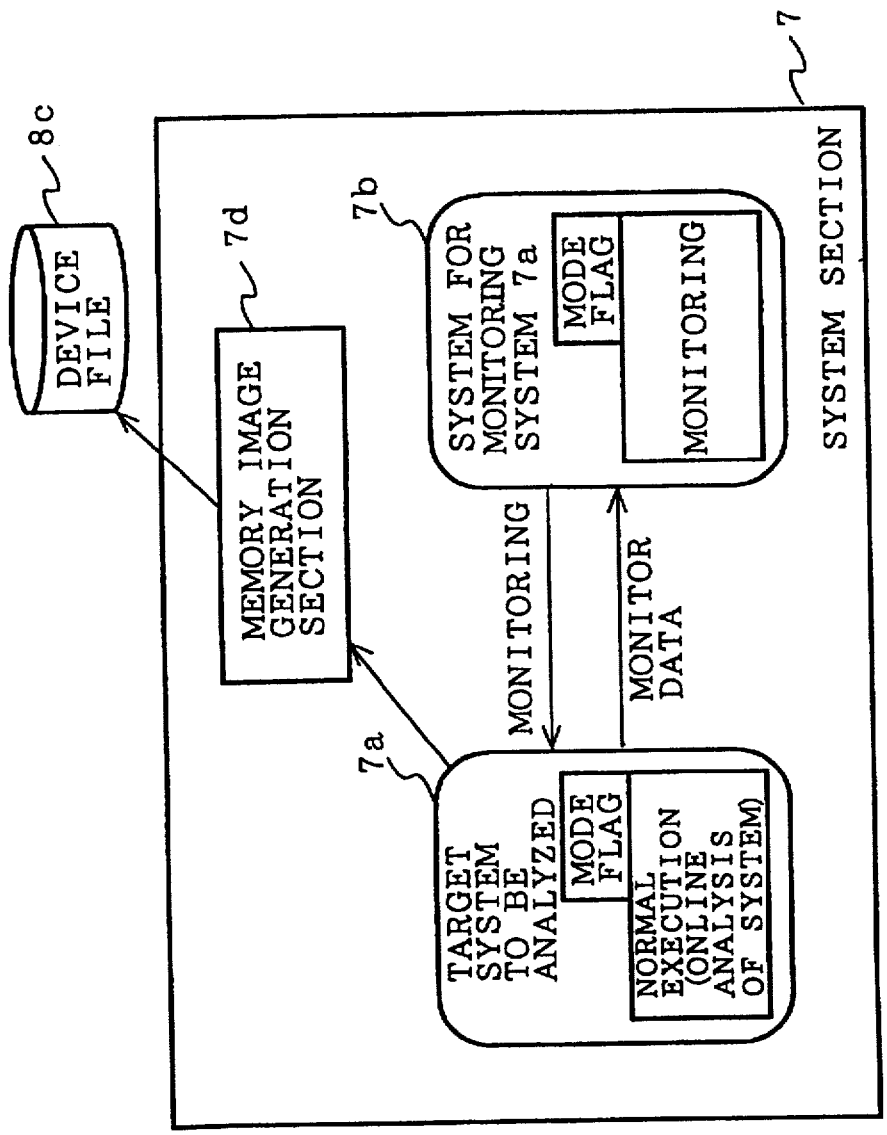
FIGS. 2A and 2B are diagrams showing a configuration and an operation flow of a system section in the computer system analysis device 100 as shown in FIG. 1.

In a normal operation of the system 7a which is the target of the analysis of the system failure by the alternative system 7b, as shown in FIG. 2A, a monitor mode flag in the system 7a is set to a normal operation mode. The monitor mode flag indicates whether or not there is a system failure in the system 7a. In this case, the alternative system 7b monitors or watches the operation of the system 7a and a monitor mode flag in the alternative system 7b is set to a monitor mode. Thus, at the normal operation mode, the system 7a transmits a monitor data in the monitor mode flag to the alternative system 7b. The memory image generation section 7d in the system section 7 generates the device file 8c.

Figure 2B:
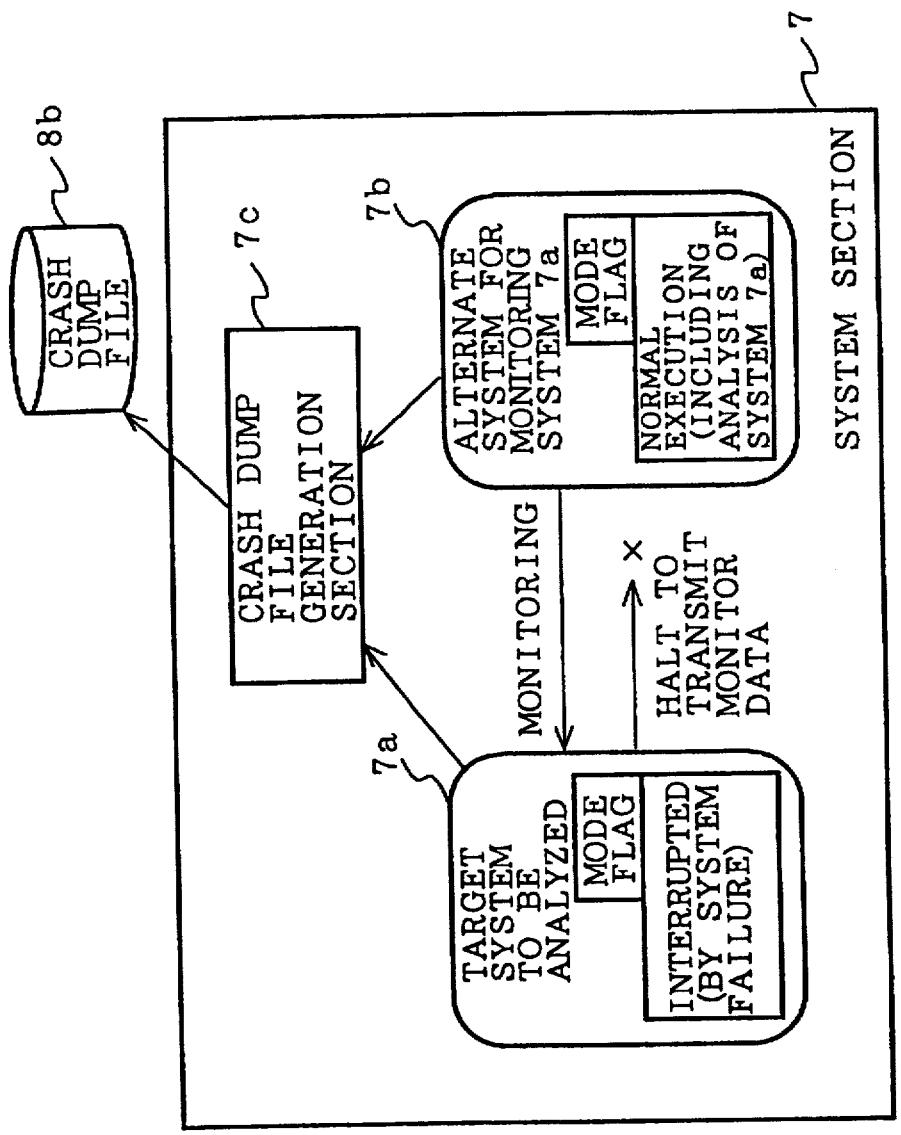

If a system failure is happened in the system 7a by some influence, the crash file generation section 7c generates the crash dump file 8b, and as shown in FIG. 2B, the transmission of the monitor mode flag data from the system 7a to the alternative system 7b is halted. Then, the monitor mode flag in the system 7a is set to the halt mode. At this time, the monitor mode flag in the alternative system 7b is changed from the monitor mode to a normal operation mode and the alternative system 7b is connected to the crash file generation section 7c and the memory image generation section 7d instead of the system 7a. Thus, the alternative system 7b works instead of the system 7a in the occurrence of the system failure.

In addition, as will be explained in detail later, the analyze section 6 can analysis the system failure of the system 7a by using the crash dump file 8b of the kernel section of the system 7a which has been made when the system 7a is stopped by the occurrence of the system failure.

Next, the operation of the analysis section 6 in the computer system analysis device 100 will be explained with reference to FIGS. 3A to 3C.

Figure 3A:
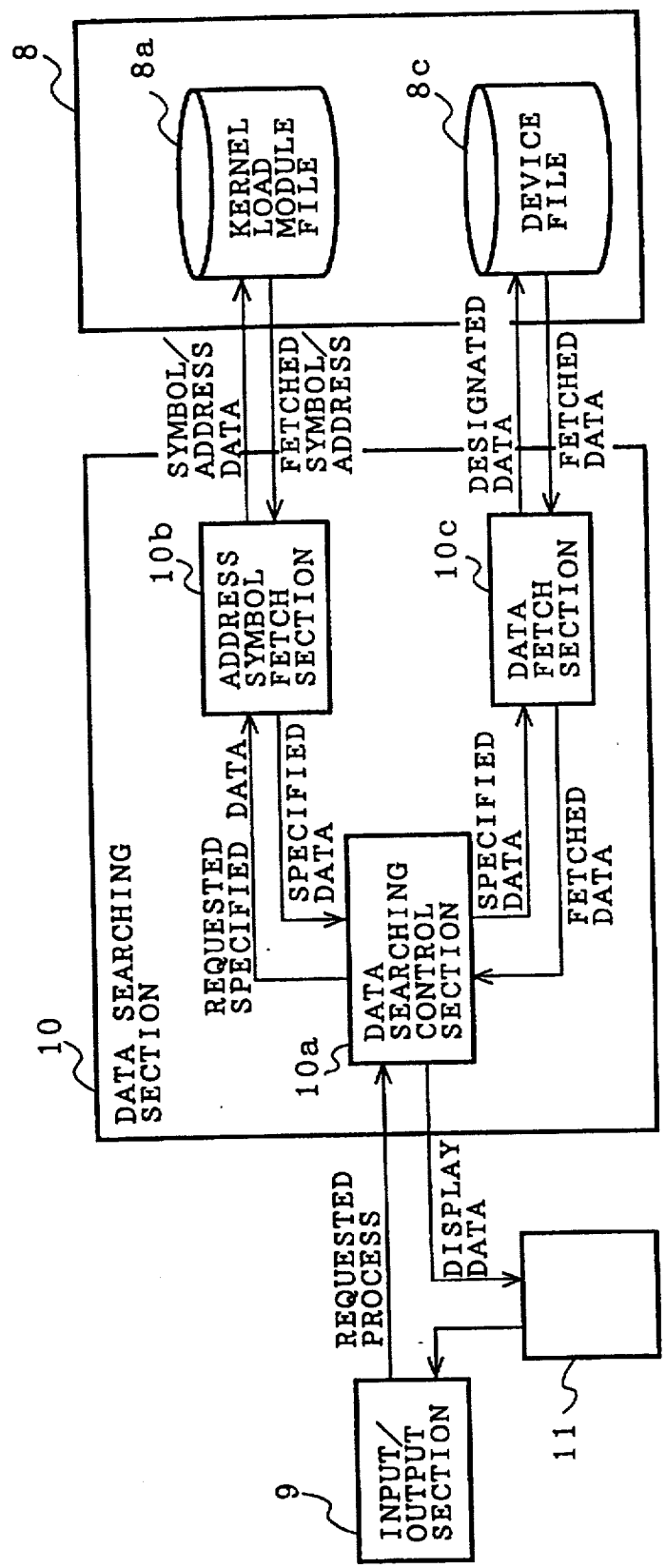
FIGS. 3A, 3B, and 3C are configurations and states of an analysis section in the computer system analysis device as shown in FIG. 1.

FIG. 3A is a diagram showing the configuration and the state of the data searching section 10 in the computer system analysis device 100 for analyzing the state of the system 7a under the normal operation mode.

In FIG. 3A, the data searching control section 10a receives the data which is transmitted from the input/output section 9, and transmits a request based on the data obtained from the input/output section 9 to the address symbol fetch section 10b. Then, the address symbol fetch section 10b fetches a symbol or an address data from the kernel load module file 8a based on the data transmitted from the data searching control section 10a. The fetched symbol data or the fetched address data is transmitted from the data searching control section 10a to the data fetch section 10c. The data fetch section 10c fetches memory image data of the system 7a by searching the device file 8c based on the fetched symbol data or the fetched address data. Thus, the data which is indicated by the input/output section 9 can be obtained and displayed on the input/output section 9. The obtained data is processed by the page display control section 11 and can be displayed per page on the input/output section 9.

As described above, during the normal operation mode of the system 7a, data items which an operator wants to display on the input/output section 9 such as a keyboard and a display monitor can be displayed periodically on the display monitor per page only by executing periodically the operation described above.

Figure 3B:
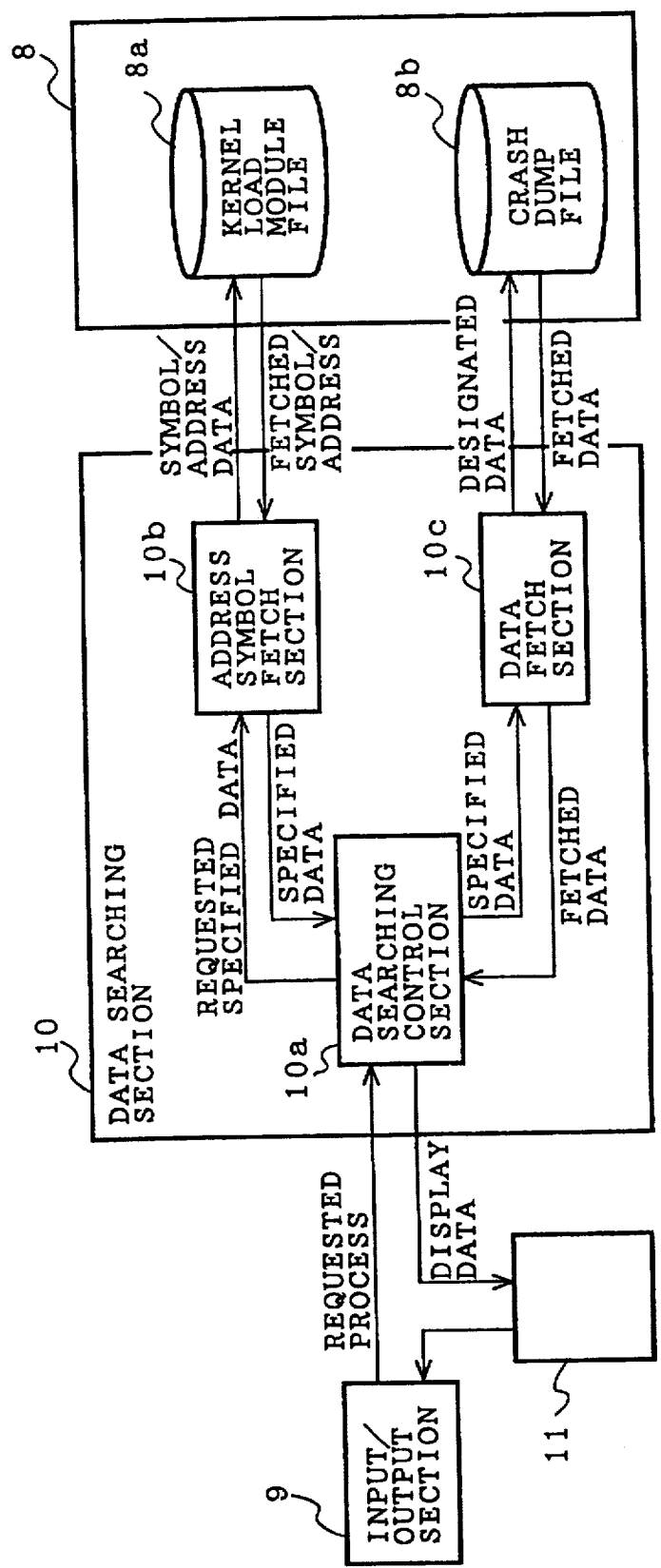

FIG. 3B is a diagram showing the configuration and the state of the data searching section 10 in the computer system analysis device 100 when the system 7a is fallen into the system failure by some influence.

In this case, the computer system analysis device 100 searches and analyzes the kernel load module file 8a and the device file 8c based on the symbol data and the address data which are obtained by instruction data transmitted from the input/output section 9. In addition, the data fetch section 10c is connected to the crash dump file 8b which has been generated at the time of the occurrence of the system failure under the indication of the alternative system 7b, and then the data fetch section 10c searches the crash dump file 8b. Thereby, system failure information indicating the state of system 7a at the time of the occurrence of the system failure can be displayed rapidly on the input/output section 9 for the system failure analysis.

In addition, because the values of the data or information obtained based on the request data transmitted from the input/output section 9 are stored into the state file 8d during the normal operation mode of the system 7a, these data stored in the state file 8d can be compared with the data in the crash dump file 8b when the system 7a is fallen into the system failure under the request of an operator. In this case, the operator can get the various data items for analyzing the system 7a in the normal operation mode.

Figure 3C:
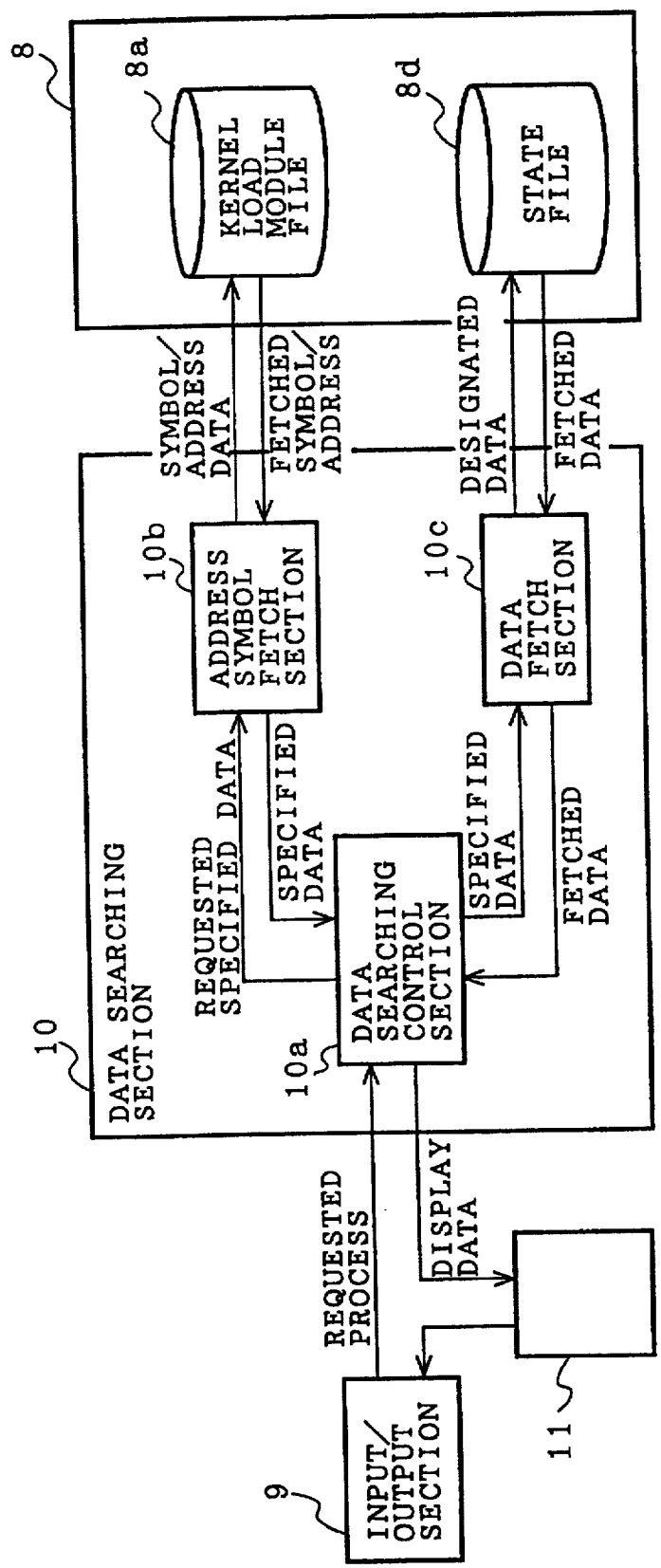

FIG. 3C is a diagram showing the configuration and the state of the data searching section 10 in the computer system searching device for performing the data searching operation in the state file 8d.

As explained above, in the computer system analysis device 100 of the embodiment 100, the control is switched from the system 7a to the alternative system 7b when a system failure of the system 7a is happened. Because all of data items relating to the system 7a are target information to analyze a system failure by the computer system analysis device 100 of the embodiment 1, any data item can be fetched and displayed on the input/output section 9 by receiving a data item requested from the input/output section 9. Therefore an operator can analyze the system failure of the system 7a accurately.

In the configuration of the computer system analysis device 100 of the embodiment 1 described above, although the page display control section 11 is incorporated in the analysis section 6, but the present invention is not limited by this configuration, for example, it may be acceptable to locate the page display control section 11 outside of the analysis section 6.

EMBODIMENT 2.

Figure 4:
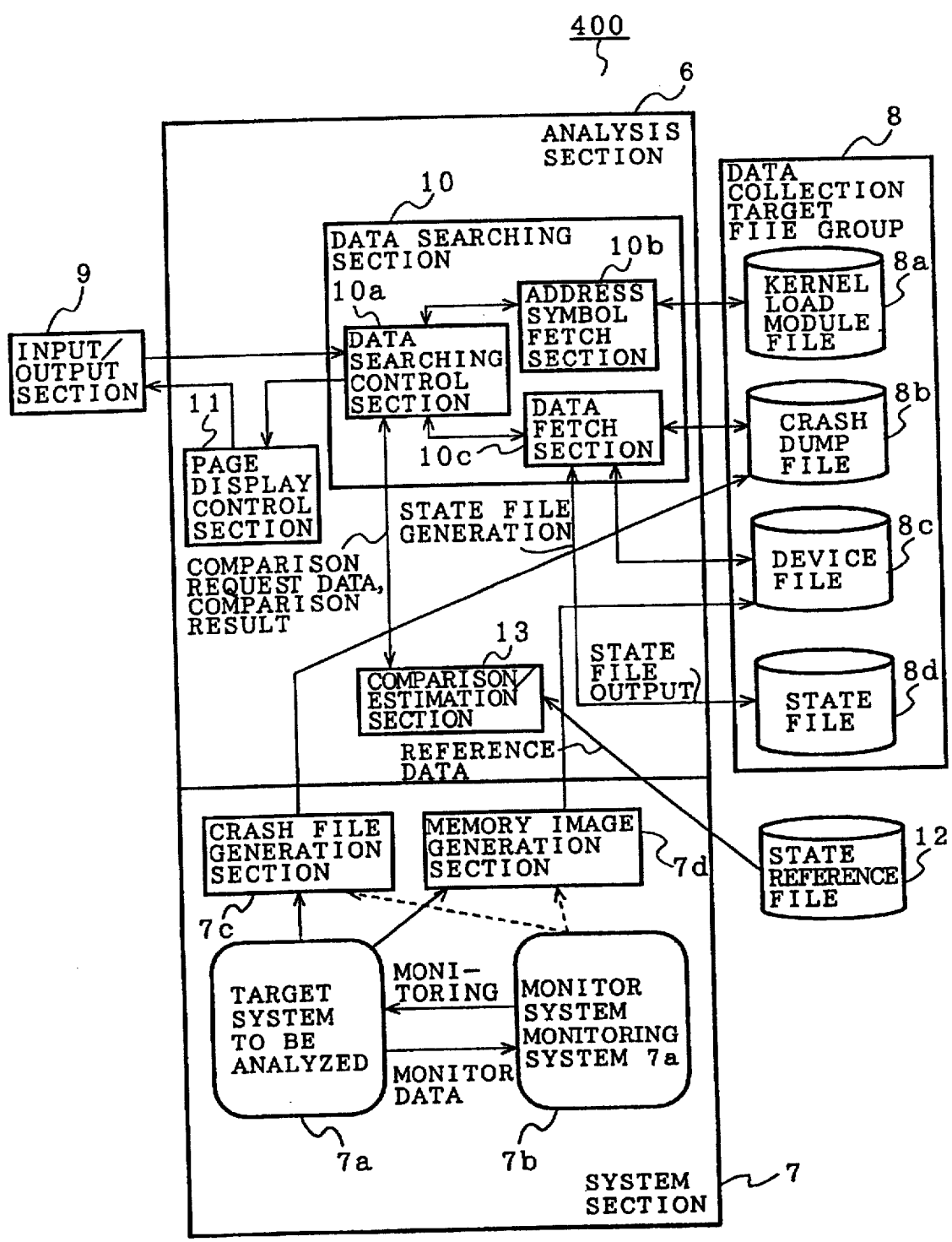
FIG. 4 is a diagram showing a configuration of a computer system analysis device as an embodiment 2 according to the present invention.

FIG. 4 is a diagram showing a configuration of a computer system analysis device 400 as another embodiment 2 according to the present invention.

In the computer system analysis device 400 shown in FIG. 4, components which are same of components in the computer system analysis device 100 of the embodiment 1 shown in FIG. 1 in configuration and function are referenced with the same reference numbers and the explanations for them are omitted here.

The configuration of the computer system analysis device 400 has a comparison/estimation section 13 in addition to the configuration of the computer system analysis device 100 shown in FIG. 1. The comparison/estimation section 13 compares data from the state file 8d with reference data from the state reference file 12.

Allowable ranges of various types of data items in the normal operation mode of the system 7a are stored in the state reference file 12. For example, a permissible range of a voltage, temperatures, an allowable limits of vibration, and the like are defined and stored in the state reference file 12. In addition to these variables, the maximum number of processes, threads, files which can be opened, a predetermined value of load, and other kinds of data items are also stored in the state reference number 12.

In the computer system analysis device 400 having the comparison/estimation section 13, the data searching control section 10a receives the request transmitted from the input/output section 9, and then searches the state file 8d in order to obtain a target data item. The target data from the state file 8d is compared with the data item stored in the state reference file 12 which stores the data in the normal operation mode by the comparison/estimation section 13. Because the state file 8d stores the data items which are obtained by searching the device file 8c based on the request data transmitted from the input/output section 9, it can be estimated and checked whether or not the system 7a operates correctly when the state file is generated by comparison of the comparison/estimation section 13. If there is difference between both the data items, the operator can know that the system 7a is fallen into the system failure. In this case, the operator can detect and analyze the system failure in order to estimate a cause of the system failure by displaying various abnormal data items.

In addition, in vibration sensing such as earthquake sensing, the computer system can be stopped in case of emergency if there causes a vibration of more than a predetermined magnitude by comparing the both data items between the state file 8c and the state reference file 12.

Because the operator performs a process request periodically through the input/output section 9, the analysis of the state of the system can be rapidly performed by setting the detection period to a predetermined value.

Moreover, the kinds of data items which are compared with data items stored in the state reference file 12 by the comparison/estimation section 13 is not limited to data items in the state file 8d. The comparison/estimation section 13 can compare data items stored in the crash dump file 8b and the device file 8c with data items stored in the state reference file 12 through the data fetch section 10c. Specifically, when the crash dump file 8c is selected and then used for comparison by the comparison/estimation section 13, the computer system analysis device 400 must check data relating to the system failure of the system 7a. On the other hand, when the device file 8c is selected and used for comparison by the comparison/estimation section 13, the computer system analysis device 400 checks whether or not the system 7a is executed correctly.

EMBODIMENT 3.

Although the computer system analysis devices 100 and 400 of the embodiments 1 and 2 described above analyzes a system failure by using data obtained when the system failure is happened, the computer system analysis device of the present invention can accurately analyze a system failure in an early stage by using a system failure control table in which data items relating to various kinds of data items of the system failure are stored in advance and by relating a request data item transmitted from the input/output section 9 to the data item in the system failure control table.

Figure 5:
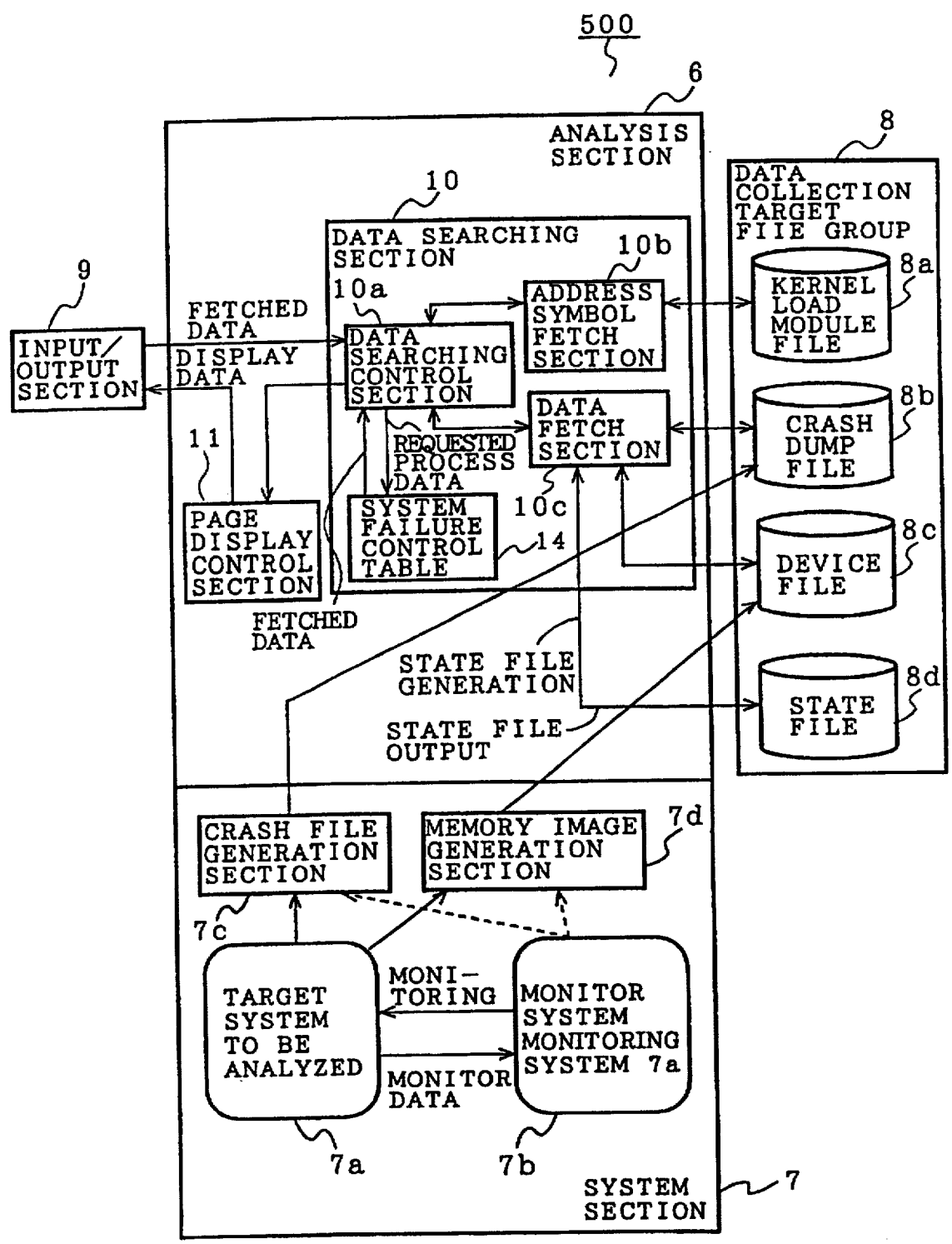
FIG. 5 is a diagram showing a configuration and an operation flow of a computer system analysis device as an embodiment 3 according to the present invention.

FIG. 5 is a diagram showing a configuration of a computer system analysis device 500 of an embodiment 3 according to the present invention.

In the computer system analysis device 500 shown in FIG. 5, components which are same of components in the computer system analysis device 400 of the embodiment 2 shown in FIG. 4 in configuration and function are referenced with the same reference numbers and the explanations for them are omitted here.

In FIG. 5, a reference number 14 designates the system failure control table. In the system failure control table 14, there is a table in which data items relating to the cause of each system failure. The data searching control section 10a controls the access to this table.

FIG. 6 is a diagram showing an illustrative example of the system failure control table.

In the computer system analysis system 500 having the above configuration of the embodiment 3 shown in FIGS.5 and 6, when the data searching control section 10a receives data items relating to an operation request transmitted from the input/output section 9, the data searching control section 10a searches the system failure control table 14, fetches data items in the system failure control table 14 corresponding to the requested data items, and transmits the obtained data items to the input/output section 9.

In addition, when other data items relating to the obtained data items are also searched and then displayed on the input/output section 9, an operator can detect the system failure of the system 7a in an early stage and analyze the system failure efficiently. Therefore the operator can perform easily analysis of the system failure.

In the computer system analysis device 100, 400, and 500 of the embodiments 1 to 3 according to the present invention, because other relating data items in addition to data item which is requested by the input/output section 9 can be fetched and displayed, an operator can detect a system failure of a computer system in an early stage.

EMBODIMENT 4.

When the computer system 7a and the alternative computer system 7b in the embodiments 1-3 are constructed in a multi-processor configuration by using a plurality of processors, the system reliability can be more increased.

Figure 7:
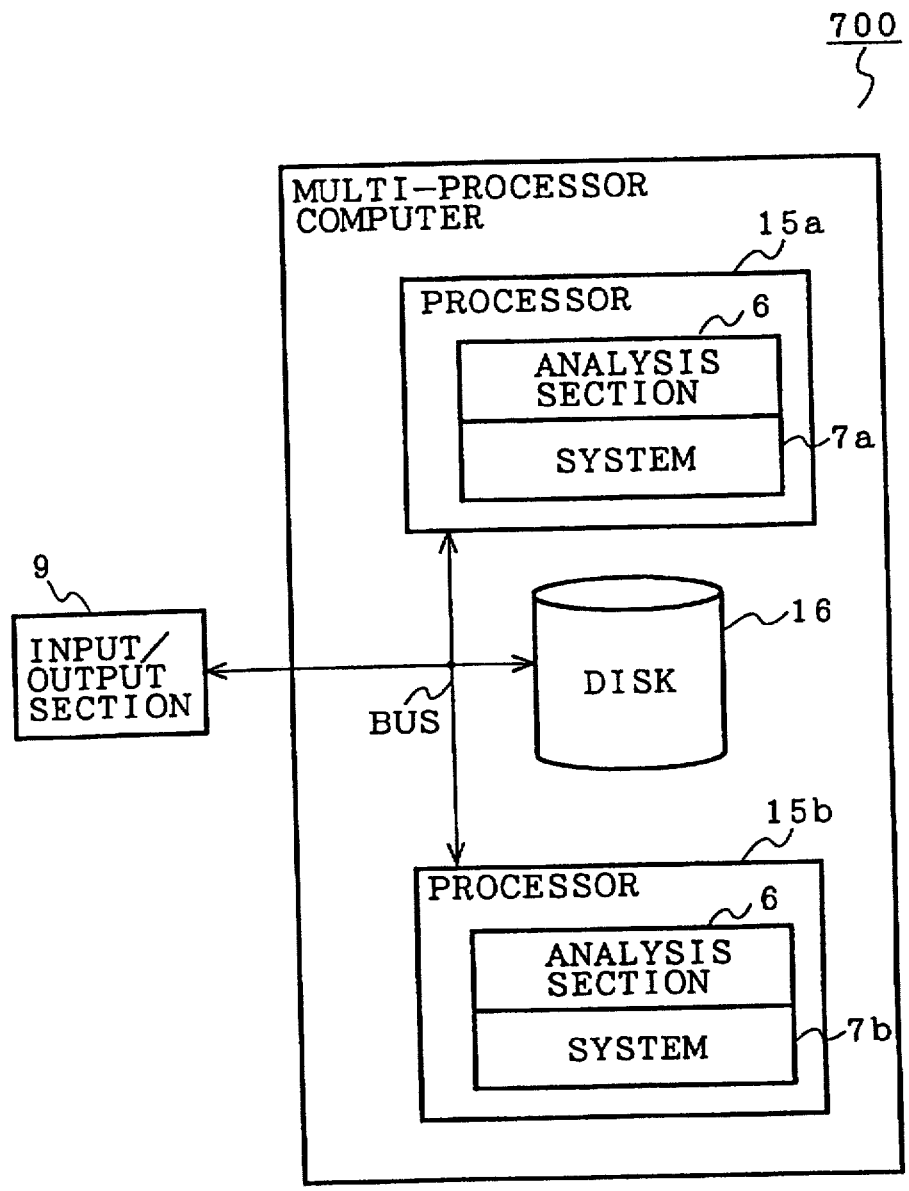
FIG. 7 is a diagram showing a configuration of a computer system analysis device as an embodiment 4 according to the present invention.

FIG. 7 is a diagram showing a configuration of a computer system analysis device 700 of an embodiment 4 according to the present invention.

The computer system analysis device 700 shown in FIG. 7 comprises a processor 15a having the computer system 7a as the target computer system for the analysis of the system failure and the analysis section 6 and a processor 15b having the alternative computer system 7b which watches the operation of the computer system 7a during the normal operation and becomes the control system when a system failure is happened and the analysis section 6. The processor 15a is connected to the processor 15b and a disk 15 through a bus. The disk 16 stores the various types of files such as the data collection file group 8 to be searched by the data searching section 10. These files stored in the disk 16 can be accessed by both the processors 15a and 15b.

In the computer system analysis device 700 of the embodiment 4 having the configuration described above, because two processors 15a and 15b are used, the control operation can rapidly be switched to the alternative computer system 7b from the computer system 7a when the system failure is happened. Therefore an operator can detect and analyzes the cause of the system failure, so that the system reliability can be more increased.

In addition, the system reliability can be further increased in a case that a plurality of processors, each processor including the alternative computer system 7b, are incorporated into a computer system analysis device and the plurality of processors are connected to each other through bus.

EMBODIMENT 5.

Figure 8:
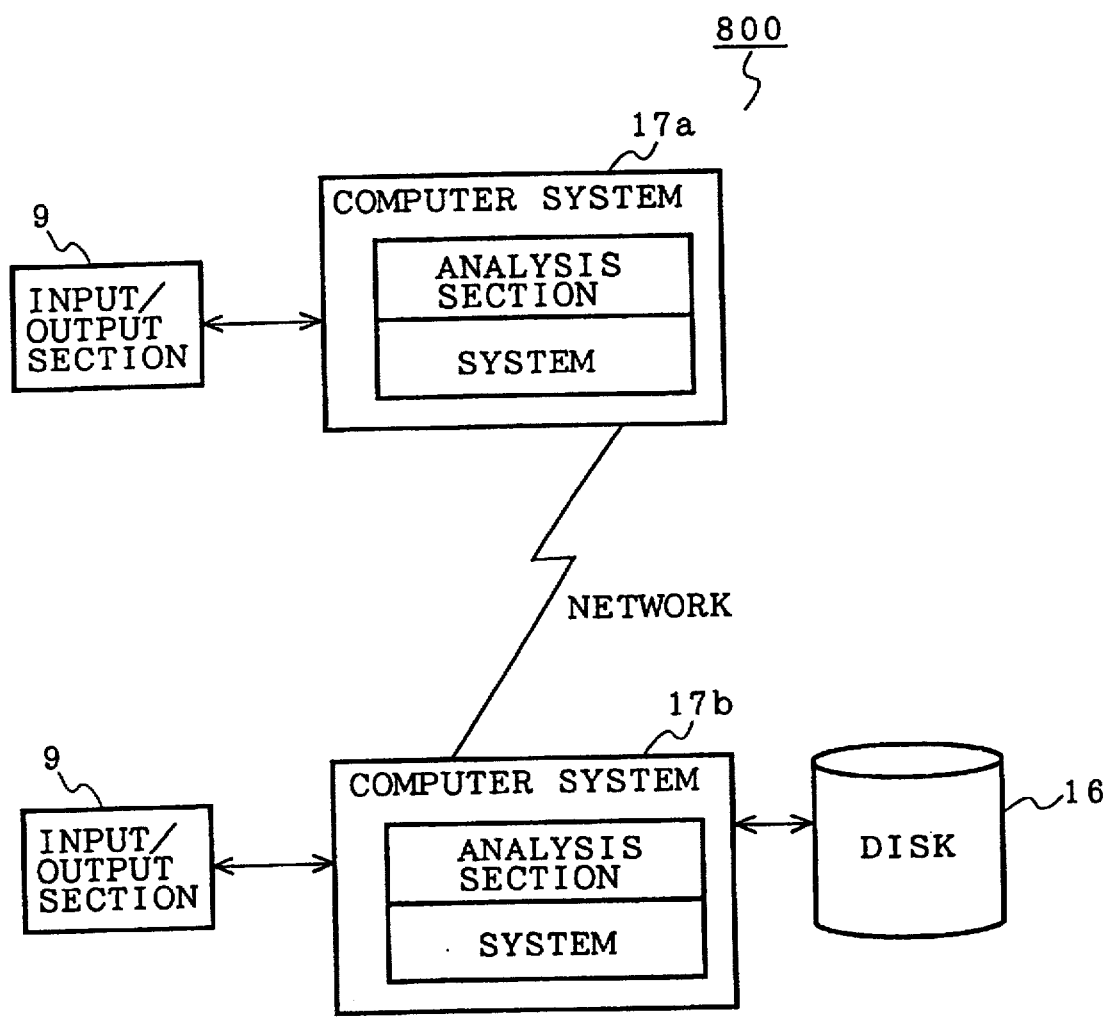
FIG. 8 is a diagram showing a configuration of a computer system analysis device as an embodiment 5 according to the present invention.
Figure 9:
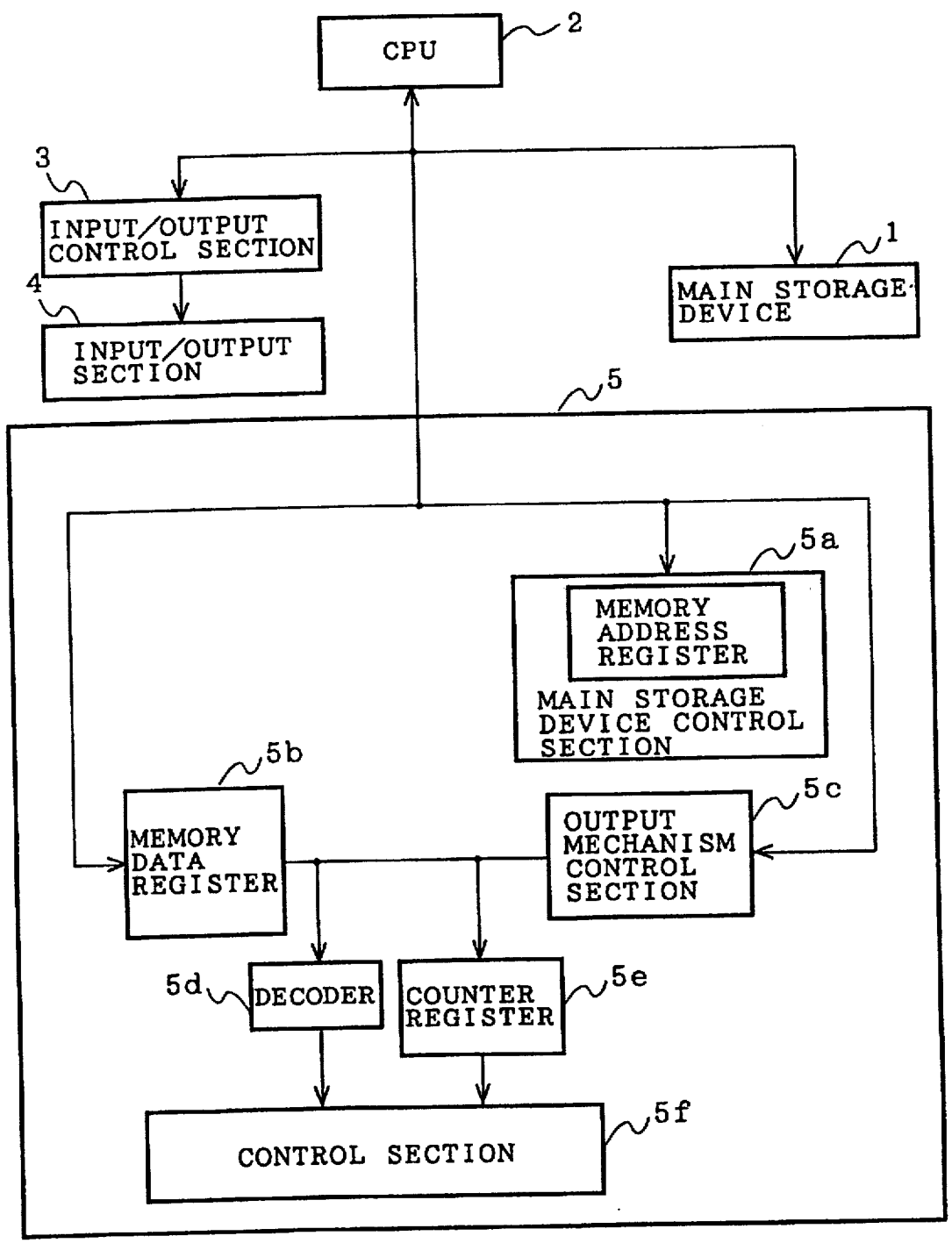
FIG. 9 is a diagram showing a configuration of a conventional computer system analysis device.

FIG. 8 is a diagram showing a configuration of a computer system analysis device 800 as an embodiment 5 according to the present invention.

In the computer system analysis device 800 shown in FIG. 8, the system 7a and the alternative system 7b are incorporated into different computer system 17a and 17b respectively. These computer systems 17a and 17b are connected through a network. In this case, each of the computer systems 17a and 17b connected through the network has the input/output section 9, the computer system 17b incorporating the alternative computer system 7b which watches and checks the computer system 7a is connected to the disk 16. By using the computer system analysis device 800 having the configuration described above, an operator can detect and analyze the system failure of the system 7a from a distant place easily and correctly.

As described above in detail, the computer system analysis device of the present invention has the following effects.

Immediately after a system failure of a target computer system is detected, because data items to be required for the analysis of the system failure can be requested through the input/output section and required data items can be searched and fetched in the data collection files by using the requested data items, and obtained data items are displayed on the input/output section, an operator can analyze the cause of the system failure and the state of the target system at the occurrence of the system failure in an early stage.

In addition, the requested data items can be obtained instantly because the data collection files are searched by using an address data which indicates the location of the required data items in the collection files.

Moreover, the analysis of the cause of a system failure can be rapidly performed because the crash dump file which is made at the time of the occurrence of the system failure is in the data collection target file group.

Further, a system failure can be detected by the indication or the request from the input/output section during the operation of the system because the device file which stores a memory image while the system is operated in the normal operation is included in the data collection target file group.

Furthermore, because data items in the state reference file which stores the range of the various types of data items in the normal operation mode of the computer system are compared with data items stored in the data collection target file group, an operator can obtain and analyze data items relating to the cause of the system failure immediately.

In addition, the analysis of the cause of a system failure can be easily performed because the computer system analysis device of the present invention has the system failure control table in which data items relating to the system failure are defined and stored.

Moreover, the analysis of the cause of a system failure can be rapidly performed because the values of data items in addition to the data items relating to the system failure are displayed on the input/output section.

In addition, the detection of a system failure can be certainly performed because a list of data items, which will be caused by a system failure, relating to a data item requested by the input/output section can be displayed on the input/output section.

Further, the reliability of the computer system and the response speed of the computer system can be increased because the computer system to be analyzed and an alternate computer system are incorporated in a multi-processor system having a plurality of processors.

Furthermore, an operator can analyze the cause of a system failure of a target computer system from a separate point or place in distance because the computer system to be analyzed and an alternative computer system are connected by a network.

What is claimed is:

1. A computer system analysis device comprising:

file generation means for detecting a system failure of a computer system as an analysis target of a system failure and for generating data collection target files to store data items required for analyzing the system failure;

input means for indicating data items stored in said data collection target files to be required for the analysis of the system failure;

a system failure control table for storing system failure types and data items associated with each of the system failure types;

data fetch means for receiving the data items indicated by said input means and related data items associated with a same system failure type as the data items indicated by said input means, and for searching said data collection target files and for fetching required data items stored in said data collection target files corresponding to the data items indicated by said input means and the related data items; and output means for receiving the fetched data items from said data fetch means and for displaying the fetched data items.

2. A computer system analysis device comprising:

file generation means for detecting a system failure of a computer system as an analysis target and for generating a data collection target file group comprising a plurality of data collection files to store required data items to analyze the system failure;

storage means for storing said plurality of data collection files;

input means for indicating data items stored in said data collection files to be required for the analysis of the system failure;

a system failure control table for storing system failure types and data items associated with each of the system failure types;

analysis means for receiving the data items indicated by said input means and related data items associated with a same system failure type as the data items indicated by said input means, and for searching said data collection target files and for fetching data items stored in said data collection files corresponding to the data items indicated by said input means and the related data items; and output means for receiving the fetched data items from said analysis means and for displaying the fetched data items.

3. A computer system analysis device as claimed in claim 2, further comprising page display means for receiving the fetched data items from said analysis means and for arranging the fetched data items per page and for transmitting the arranged data items to said output means per page.

4. A computer system analysis device as claimed in claim 2, wherein said analysis means comprises address means for generating address data in the data collection files relating to the data items indicated by said input means based on a load module file (or a current execution file) being executed by an arithmetic logical unit as a kernel section in said computer system, wherein said analysis means searches said plurality of data collection files based on the address data obtained by said address means.

5. A computer system analysis device as claimed in claim 2, wherein said file generation means generates a crash dump file, as one of said data collection files, expressing a memory image when the system failure of said computer system happens and searches said crash dump file with the data items indicated by said input means to analyze the system failure of said computer system.

6. A computer system analysis device as claimed in claim 4, wherein said file generation means generates a crash dump file, as one of said data collection files, expressing a memory image when a system failure of said computer system happens and searches said crash dump file with the data items indicated by said input means to analyze the system failure of said computer system.

7. A computer system analysis device as claimed in claim 2, wherein
said file generation means generates a device file, as one of said data collection files, expressing a memory image when said computer system is in a normal operation, said analysis means searching said device file based on the data items indicated by said input means during the normal operation mode in order to analyze the system failure of said computer system.

8. A computer system analysis device as claimed in claim 4, wherein
said file generation means generates a device file, as one of said data collection files, expressing a memory image when said computer system is in a normal operation, said analysis means searching said device file based on the data items indicated by said input means during the normal operation mode to analyze the system failure of said computer system.

9. A computer system analysis device as claimed in claim 2, further comprises:
a state reference file for storing an allowable range of each of data items in the computer system to be used for analyzing a system failure during a normal operation mode of said computer system, and
comparing means for comparing the data items in the state reference file with said data items indicated by said input means,
wherein said comparing means has a function to transmit a comparison result to said output means.

10. A computer system analysis device as claimed in claim 4, further comprises:
a state reference file for storing an allowable range of each of data items in the computer system to be used for analyzing a system failure during a normal operation mode of said computer system, and
comparing means for comparing the data items in the state reference file with said data items indicated by said input means,
wherein said comparing means has a function to transmit a comparison result to said output means.

11. A computer system analysis device as claimed in claim 5, further comprises:
a state reference file for storing an allowable range of each of data items in the computer system to be used for analyzing a system failure during a normal operation mode of said computer system, and
comparing means for comparing the data items in the state reference file with said data items indicated by said input means,
wherein said comparing means has a function to transmit a comparison result to said output means.

12. A computer system analysis device as claimed in claim 7, further comprises:
a state reference file for storing an allowable range of each of data items in the computer system to be used for analyzing a system failure during a normal operation mode of said computer system, and
comparing means for comparing the data items in the state reference file with said data items indicated by said input means,
wherein said comparing means has a function to transmit a comparison result to said output means.

13. A computer system analysis device as claimed in claim 2, further comprises means for displaying the data items obtained from said the plurality of data collection files together with the data items requested by said input means on said output means in a one-to-one correspondence when the data items representing the cause of the system failure relating to the data items requested through said input means are displayed on the output means.

14. A computer system analysis device as claimed in claim 2, further comprises:
a system failure control table for storing system failure data items corresponding to kinds of system failure and data items relating to these kinds of system failure to be analyzed; and
means for searching data items relating to the system failure which would be caused stored in said system failure control table based on the data items indicated by said input means and for reading out data items obtained from said system failure control table and transmitting the data items to said output means.

15. A computer system analysis device as claimed in claim 2, further comprising:
a state file as a data collection target file of said data collection target file group;
a crash dump file, as a data collection target file of said data collection target file group, expressing a memory image when the system failure of said computer system occurs; and
comparing means for comparing the data items in the state reference file with the data items in the crash dump file.

16. A computer system analysis device as claimed in claim 2, further comprising:
a state file as a data collection target file of said data collection target file group;
a state reference file for storing an allowable range of each of data items in the computer system to be used for analyzing a system failure during a normal operation mode of said computer system; and
comparing means for comparing the data items in the state file with the data items in the state reference file.

17. A computer system analysis device as claimed in claim 2, further comprising:
a crash dump file, as a data collection target file of said data collection target file group, expressing a memory image when the system failure of said computer system happens;
a state reference file for storing an allowable range of each of data items in the computer system to be used for analyzing a system failure during a normal operation mode of said computer system; and
comparing means for comparing the data items in the crash dump file with the data items in the state reference file, so as to check the data required for the analysis of the system failure.

18. A computer system analysis device as claimed in claim 2, further comprising:
a device file, as a data collection target file of said data collection target file group;
a state reference file for storing an allowable range of each of data items in the computer system to be used for analyzing a system failure during a normal operation mode of said computer system; and
comparing means for comparing the data items in the device file with the data items in the state reference file so as to check whether the system is executing correctly.

19. A control system analysis device comprising:
(1) a first processor system comprising:
- a computer system as a target of an analysis of a system failure, said computer system executing under a normal operation; and
- file generation means for detecting an occurrence of the system failure of said computer system and for generating a data collection file group comprising a plurality of data collection files which store data items to be required for analysis of the system failure;

(2) memory storage means for storing said plurality of data collection files;

(3) input means for indicating data items relating to the data items stored in said plurality of data collection files to be required for the analysis of the system failure;

(4) a system failure control table for storing system failure types and data items associated with each of the system failure types; and (5) a second processor system used for analyzing the system failure of the first processor system at the time of the occurrence of the system failure, comprising:
- an alternative computer system for controlling the analysis of the system failure;
- switching means for switching the operation of said computer system to said alternative computer system when the system failure happens; and
- analysis means for receiving the data items requested by said input means and related data items associated with a same system failure type as the data items indicated by said input means, and for searching said data collection target files by using the requested data items and for fetching data items stored in said data collection files corresponding to the data items requested by said input means and the related data items;

(6) output means for receiving the fetched data items from said analysis means and for displaying the fetched data items; and (7) bus means through which said first processor system, said second processor system, said input means, and said output means are connected.

20. A control system analysis device comprising:
(1) a first processor system comprising:
- a computer system as a target of an analysis of a system failure, said computer system executing under a normal operation;
- file generation means for detecting an occurrence of a system failure of said computer system and for generating a data collection file group comprising a plurality of data collection files which store data items to be required for analysis of the system failure;

(2) memory storage means for storing said plurality of data collection files;

(3) input means for indicating data items relating to the data items stored in said plurality of data collection files to be required for the analysis of the system failure;

(4) a system failure control table for storing system failure types and data items associated with each of the system failure types;

(5) a second processor system used for analyzing the system failure of the first processor system at the time of the occurrence of the system failure, comprising:
- an alternative computer system for controlling the analysis of the system failure;
- switching means for switching the operation of said computer system to said alternative computer system when the system failure happens; and
- analysis means for receiving the data items requested by said input means and the related data items, and for searching said data collection target files by using the requested data items and for fetching data items stored in said data collection files corresponding to the data items requested by said input means and the related data items; and (6) output means for receiving the fetched data items from said analysis means and for displaying the fetched data items;

wherein said first processor system and said second processor system are connected through a network, each of said first processor system and said second processor system is connected to said input means and said output means, and said second processor system is connected to said memory storage means.

* * * * *